Dec. 15, 1942.  G. L. TRABANT  2,305,284
TRUCK
Filed Feb. 5, 1941   2 Sheets-Sheet 1
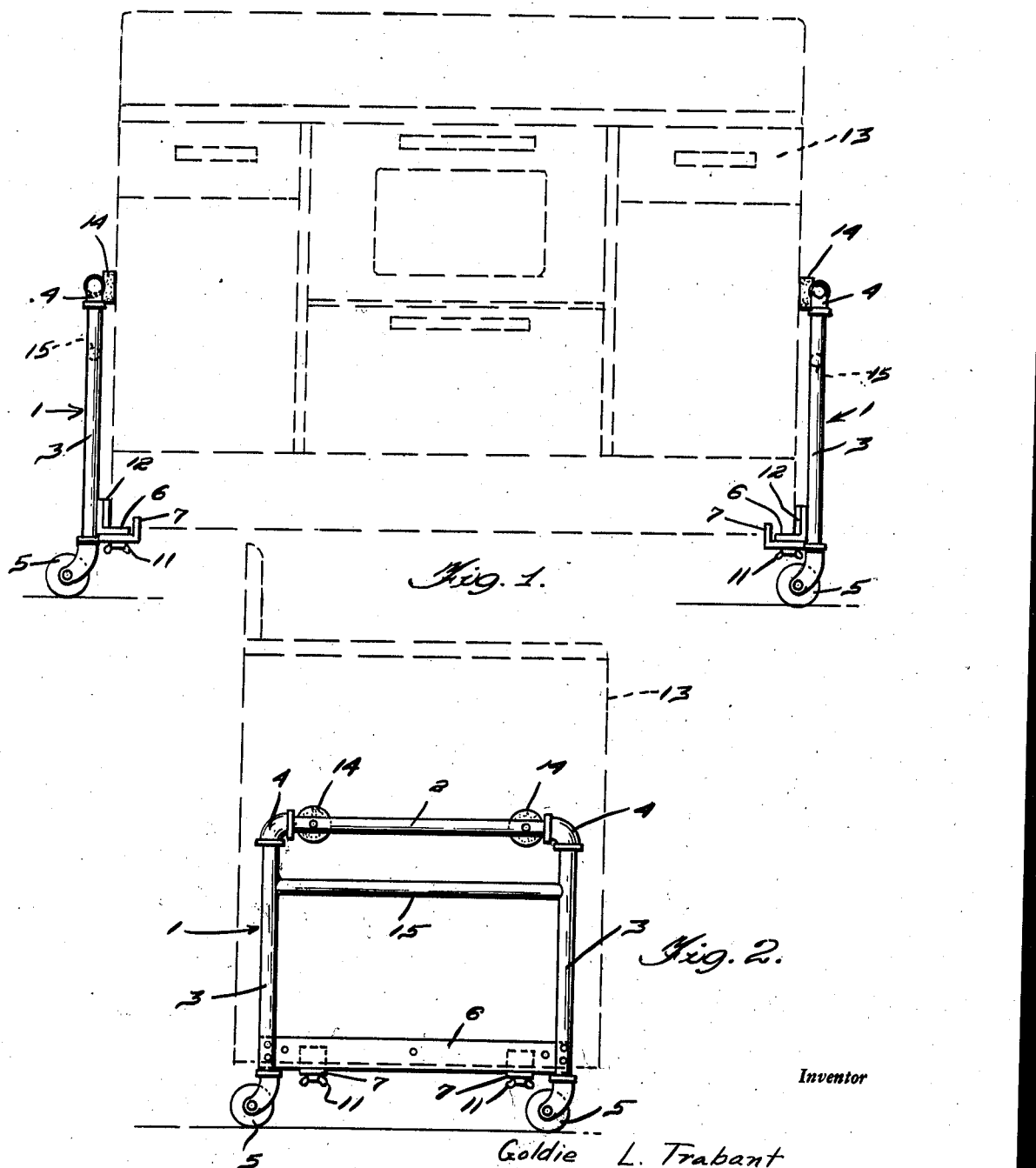
Inventor
Goldie L. Trabant
By Clarence A. O'Brien
Attorney

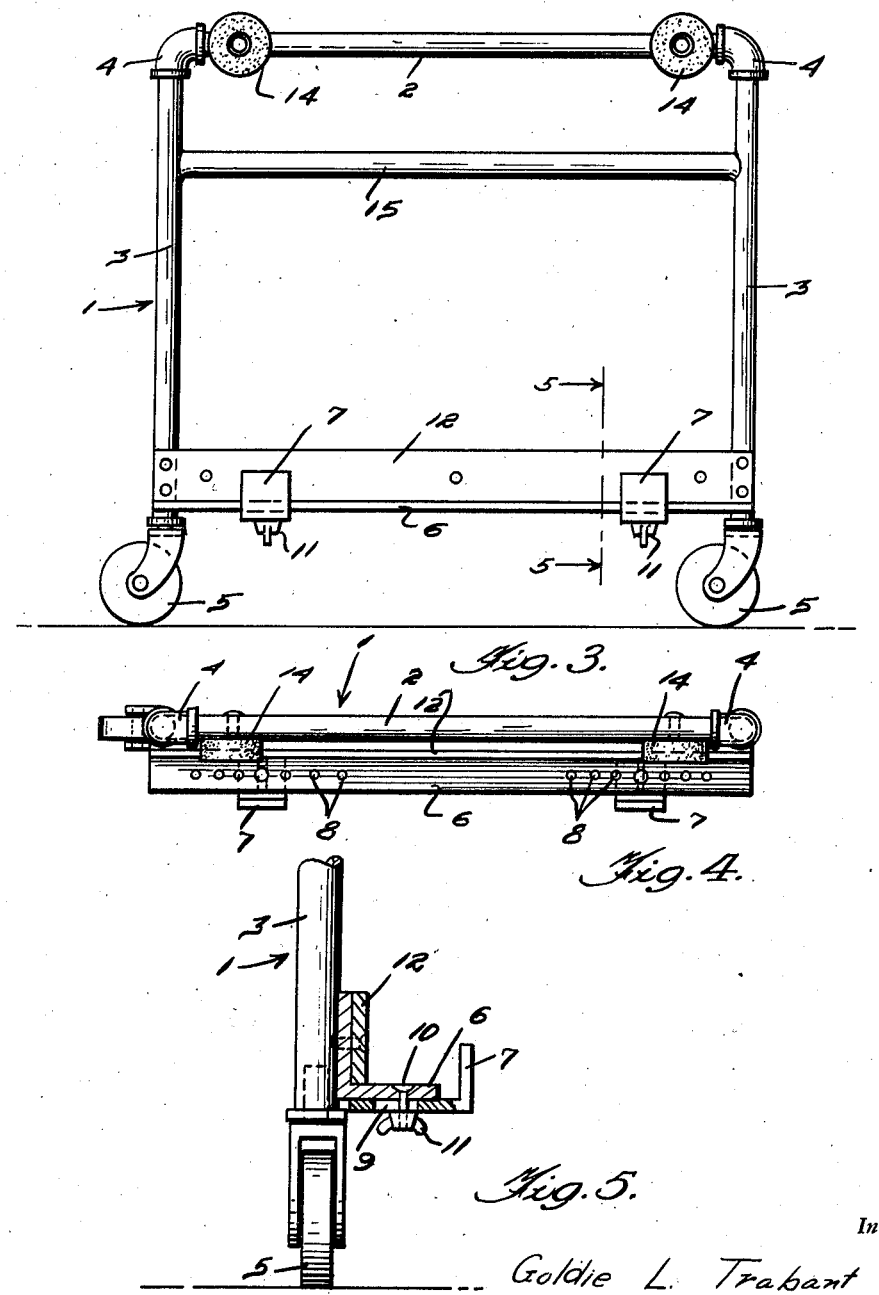

Patented Dec. 15, 1942

2,305,284

UNITED STATES PATENT OFFICE 2,305,284

TRUCK

Goldie L. Trabant, Bicknell, Ind.

Application February 5, 1941, Serial No. 377,568

1 Claim. (Cl. 280—61)

The present invention relates to new and useful improvements in trucks and has for its primary object to provide, in a manner as hereinafter set forth, novel means whereby stoves, refrigerators and other heavy objects may be moved with comparative ease by only one person, if necessary.

Another very important object of the invention is to provide a truck of the aforementioned character of such construction that the weight of the object to be moved is utilized for retaining the truck in proper engagement therewith.

Still another very important object of the invention is to provide a truck of the character described comprising a novel arrangement of adjustable clamps for positively connecting the object to be moved to said truck.

Other objects of the invention are to provide a truck of the character set forth which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of a pair of trucks constructed in accordance with the present invention, showing said trucks in use.

Figure 2 is a view in rear elevation of the truck, showing same in use.

Figure 3 is a view in front elevation of the device.

Figure 4 is a top plan view.

Figure 5 is a vertical sectional view, taken substantially on the line 5—5 of Figure 3.

Referring now to the drawings in detail, it will be seen that the embodiment of the invention which has been illustrated comprises a substantially U-shaped frame of tubular metal construction. This frame is designated generally by the reference numeral 1. The frame 1 includes a horizontal upper bar 2 and vertical legs 3, said legs 3 being connected to said bar 2 through the medium of elbows 4. Journaled in the lower ends of the legs 3 of the frame 1 are caster wheels 5.

Extending between the lower end portions of the legs 3 and rigidly secured to the fronts thereof is a seat or base 6 of suitable angle steel. Mounted beneath the horizontal portion of the base 6 is a pair of forwardly projecting hooks or clamps 7 of suitable metal. As illustrated to advantage in Figure 4 of the drawings, the base 6 has formed in its end portions spaced openings 8 to permit adjustment of the clamps 7. Also, the clamps 7 have formed therein slots 9 (see Figure 5) for longitudinal adjustment of said clamps. The openings 8 and the slots 9 receive bolts 10 for adjustably mounting the clamps 7 on the base 6, wing nuts 11 being provided on said bolts.

Mounted on the vertical portion of the base 6 is a bumper 12 of suitable wood. The bumper 12 is to prevent the base portion of the object being moved, such as a stove 13, from being damaged. Mounted on the end portions of the bar 2 of the frame 1 are resilient rubber bumpers 14 which are adapted to bear against the stove 13 or other object. Extending between the upper portions of the frame legs 3 is a tubular handle bar 15.

It is thought that the manner of using the device will be readily apparent from a consideration of the foregoing. As illustrated in Figure 1 of the drawings, two of the trucks are to be used for supporting the stove or other object to be moved, one on each end or side. Briefly, with one of the trucks in position and ready to be used, one end of the stove or other object is elevated sufficiently to permit the base 6 to be placed thereunder. This end of the object is then engaged on the base 6 and the weight thereof causes the bumpers 14 to bear firmly against said object. The clamps 7 are then adjusted and secured for positively anchoring the object on the base 6. The other truck of the pair is then placed in a similar manner at the other end or side of the object and said object is then ready to be moved on the caster wheels 5. Or, if desirable or necessary, the two trucks with the object thereon may be conveniently lifted and carried through the medium of the handle bars 15.

It is believed that the many advantages of a truck constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed. For example, the elbows 4 may be omitted and the frame 1 formed from a single length or piece of material. Further, the frame 1 may be of any suitable construction other than tubular. Also, the clamps 7 may be of various forms for engaging and retaining different objects and said clamps may be provided with spaced openings for the reception of the bolts 10 for adjustment transversely of the base 6.

What is claimed is:

A truck comprising a substantially U-shaped, tubular frame, caster wheels journaled in the end portions of the legs of said frame, a metallic base of angular cross section extending horizontally between the lower portions of said legs of the frame and engageable beneath an object to be moved, said base including a vertical portion and a horizontal portion, said horizontal portion having series of longitudinally spaced openings therein, a bumper mounted on said vertical portion of the base and extending the length thereof, clamps adjustably mounted on the horizontal portion of the base, said clamps having slots therein and further including upstanding end portions extending in opposed relation to the bumper, and bolts engageable selectively in the spaced openings and in the slots for securing said clamps in adjusted position.

GOLDIE L. TRABANT.